(12) United States Patent
Ahmed

(10) Patent No.: US 9,814,352 B2
(45) Date of Patent: Nov. 14, 2017

(54) COOKING GRATES AND GRILLS INCORPORATING SUCH GRATES

(75) Inventor: Mallik R. Ahmed, Columbus, GA (US)

(73) Assignee: CHAR-BROIL, LLC, Columbus, GA (US)

( * ) Notice: Subject to any disclaimer, the term of this patent is extended or adjusted under 35 U.S.C. 154(b) by 121 days.

(21) Appl. No.: 12/482,654

(22) Filed: Jun. 11, 2009

(65) Prior Publication Data

US 2009/0308374 A1   Dec. 17, 2009

Related U.S. Application Data

(60) Provisional application No. 61/061,018, filed on Jun. 12, 2008.

(51) Int. Cl.
A47J 37/07 (2006.01)
A47J 37/06 (2006.01)

(52) U.S. Cl.
CPC ......... *A47J 37/067* (2013.01); *A47J 37/0694* (2013.01); *A47J 37/0704* (2013.01)

(58) Field of Classification Search
CPC .. A47J 37/067; A47J 37/0704; A47J 37/0694; Y10T 428/24686; Y10T 428/1241; Y10T 428/12361; Y10T 428/24669; Y10T 428/24273
USPC ........................ 126/25 R, 152 B; 99/401, 450
See application file for complete search history.

(56) References Cited

U.S. PATENT DOCUMENTS

| | | | |
|---|---|---|---|
| 1,103,992 A * | 7/1914 | Murray | 126/41 R |
| 3,481,320 A * | 12/1969 | Schaefer | 126/25 R |
| 3,946,651 A | 3/1976 | Garcia | |
| 4,403,597 A | 9/1983 | Miller | |
| 4,703,746 A | 11/1987 | Hitch | |
| 4,727,853 A * | 3/1988 | Stephen et al. | 126/41 R |

(Continued)

FOREIGN PATENT DOCUMENTS

EP       1776028       10/2008
WO    WO2010096352    8/2010

OTHER PUBLICATIONS

Office Action dated Apr. 30, 2009 in related U.S. Appl. No. 11/291,611.

(Continued)

*Primary Examiner* — Alfred Basichas
(74) *Attorney, Agent, or Firm* — Dennis D. Brown; Brown Patent Law, P.L.L.C.

(57) ABSTRACT

Cooking grates and grills incorporating such cooking grates are provided. A representative cooking grate includes: a plurality of elongate elements of heat resistant material, the elements being V-shaped in transverse cross-section, each of the elements having a first lower edge, a second lower edge and a vertex, the first lower edge and the second lower edge being spaced from each other with the vertex being located therebetween, the vertex being operative as a cooking surface to support food during cooking on the cooking grate; corresponding adjacent lower edges of adjacent ones of the elements being oriented to define gaps therebetween such that a first of the gaps, defined by a first lower edge of a first element and a second lower edge of a second element, exhibits a width of between approximately 5% and approximately 18% of a distance between the first lower edge and the second lower edge of the first element.

8 Claims, 12 Drawing Sheets

(56) References Cited

U.S. PATENT DOCUMENTS

| | | | |
|---|---|---|---|
| 4,969,449 A * | 11/1990 | Levin | A47J 37/0786 126/221 |
| 5,033,365 A * | 7/1991 | Rao | A21B 1/245 99/349 |
| 5,105,725 A * | 4/1992 | Haglund | 99/446 |
| 5,277,106 A | 1/1994 | Raymer et al. | |
| 5,355,780 A | 10/1994 | Campbell | |
| 5,355,868 A | 10/1994 | Haen | |
| 5,467,691 A | 11/1995 | Koziol | |
| 5,603,256 A * | 2/1997 | Charlson et al. | 99/445 |
| 5,735,260 A | 4/1998 | Rimback | |
| 5,752,433 A * | 5/1998 | Charlson et al. | 99/445 |
| 5,911,812 A | 6/1999 | Stanek | |
| 5,974,954 A | 11/1999 | Rigney et al. | |
| 6,114,666 A | 9/2000 | Best | |
| 6,260,478 B1 * | 7/2001 | Harneit | 99/446 |
| 6,314,870 B1 | 11/2001 | Staller | |
| 6,520,174 B1 | 2/2003 | Scigliuolo | |
| 7,066,169 B2 | 6/2006 | Feldewerth et al. | |
| 7,207,326 B2 | 4/2007 | McKenzie | |
| 2002/0189604 A1 | 12/2002 | McKenzie | |
| 2003/0177913 A1 | 9/2003 | Dellinger | |
| 2006/0003279 A1 | 1/2006 | Best | |
| 2006/0021517 A1 | 2/2006 | Best | |
| 2007/0125357 A1 | 6/2007 | Johnston | |
| 2008/0072890 A1 | 3/2008 | Best | |
| 2008/0121117 A1 | 5/2008 | Best | |
| 2008/0311264 A1 * | 12/2008 | Tippmann et al. | 426/523 |
| 2009/0202688 A1 | 8/2009 | Best | |

OTHER PUBLICATIONS

International Search Report and Written Opinion for PCT/US09/53255, dated Oct. 19, 2009.
Communication: Supplementary European Search Report regarding European Application No. 09763817.5.

* cited by examiner

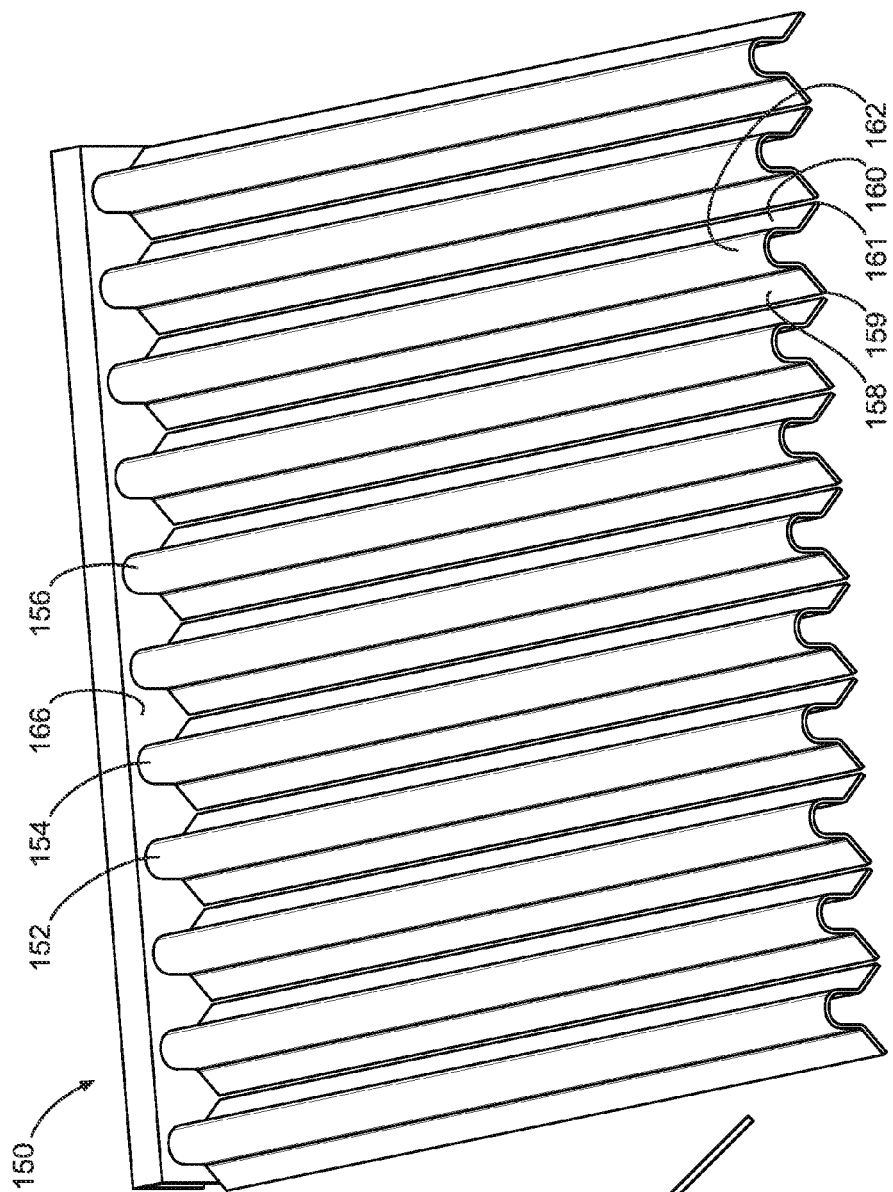
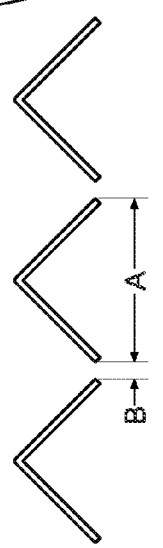
FIG. 6
FIG. 7

FIG. 11

Table 1A- Standard Cast Iron Open Grate

All data in °F

| | | | | | |
|---|---|---|---|---|---|
| 788 | 770 | 630 | 678 | 674 | 726 |
| 768 | 739 | 645 | 736 | 677 | 696 |
| 793 | 691 | 666 | 751 | 674 | 687 |
| 754 | 778 | 709 | 755 | 709 | 730 |
| 695 | 746 | 706 | 750 | 682 | 699 |

FIG. 12

Table 1B - Standard Cast Iron Open Grate (Central Portion Only)

| 739 | 645 | 736 | 677 |
|-----|-----|-----|-----|
| 691 | 666 | 751 | 674 |
| 778 | 709 | 755 | 709 |

FIG. 13

Table 2A-Sample Closed-Configuration Grate

All data in °F

| 661 | 681 | 680 | 672 | 681 | 623 |
|-----|-----|-----|-----|-----|-----|
| 710 | 759 | 732 | 732 | 744 | 701 |
| 677 | 743 | 751 | 757 | 774 | 727 |
| 599 | 718 | 721 | 748 | 763 | 700 |
| 593 | 673 | 700 | 735 | 708 | 670 |

FIG. 14

Table 2B-Closed-Configuration Grate (Central Portion Only)

| 759 | 732 | 732 | 744 |
|-----|-----|-----|-----|
| 743 | 751 | 757 | 774 |
| 718 | 721 | 748 | 763 |

COOKING GRATES AND GRILLS INCORPORATING SUCH GRATES

CROSS REFERENCE TO RELATED APPLICATION

This utility application claims the benefit of and priority to U.S. provisional application entitled, "Flame Arresting and Heat Radiating Cooking Grate," having Ser. No. 61/061,018, filed Jun. 12, 2008, which is entirely incorporated herein by reference.

BACKGROUND

Technical Field

This disclosure relates to cooking grills.

Description of the Related Art

Outdoor cooking grills are popular for many reasons including enhanced food flavor and enjoyment of the outdoor cooking process. Gas-fired cooking grills are popular for home use and differ from traditional barbecue grills in that they rely upon a gas flame for heat energy, as opposed to the combustion of charcoal briquettes or the like. Conventional burner gas grills frequently utilize generally tubular burners having multiple combustion ports or orifices. In the past, the grills often employed an inert material, such as so-called "lava rocks" or ceramic tiles, to absorb drippings from food cooking on a grate positioned above the material and to radiate heat for providing a more even heat distribution. In other more recent embodiments of conventional burner grills, metal plates of suitable material are placed between the burner and the food to protect the burner, distribute the flow of convectively heated gas and air, and provide some radiation heating. Infrared burner gas grills provide a generally planar heat source where the combustion occurs at or near the surface of a ceramic or fiber element. The planar configuration of infrared burners reduces or eliminates the need for the inert material with respect to heat distribution.

In all these cases, the food support element referred to hereinafter as the cooking grate was a relatively open structure with more than 50% open area defined as the ratio of empty to solid material when looking down on the grate in a direction perpendicular to the plane of the grate. The purpose of this open area was to let hot gases of combustion pass to and around the food disposed on the grate leading to predominately convective heating and cooking of the food, although secondary heating by radiation from burners and plates, tiles, rocks and other hot objects below the grate do contribute to heating the food.

A perceived disadvantage with such grills as described is that food drippings, such as liquefied greases and oils, pass through the open spaces in the grate and come into contact with gas flames or hot surfaces during cooking causing flash flames or "flare-ups," which can result in the charring of the food product being grilled. Although vaporization of the food drippings is desirable because the vapors enhance the flavor of food cooked on a grill, the flare-ups and flame contact frequently associated with the food drippings can be detrimental to the resulting quality of grilled food.

One attempted solution to the problem of flare-ups includes U.S. Pat. No. 5,355,780 to Campbell, which discloses a grate for a cooking grill that utilizes the spacing between the rails to prevent flames from passing through the spaces. This is shown as prior art in FIG. 1. Notably, grill 10 of FIG. 1 includes a base 16, a lid 14 (with handle 18 and hinges 20) and a cooking grate 12, all of which are supported by a pedestal 22. It should also be noted that tests of this device showed that high temperatures on the top surfaces of the grate bars led to grease fires. In addition, the grate was very heavy and expensive to manufacture due to the high weight density per square inch of the solid bars.

U.S. Pat. No. 6,114,666 to Best utilizes a ceramic infrared radiant energy emitter that is positioned above the heat source. The emitter blocks the flow of heated convective gas to the cooking grate, and re-radiates thermal energy that is absorbed from the burner below. However, in the form disclosed, grease fires can exist on the radiant emitter and pass through the grate, which has substantial open area, and contact the food.

EP Patent 1776028 to Best discloses the radiant emitter brought up into substantially close contact to the cooking grate where the cooking grate includes a series of vertical ribs. These vertical ribs form channels into which insufficient air is admitted in a downward direction from above against the thermal gradient established in the channel to allow combustion of grease drippings in the channel. Cooking is then achieved using only radiant heat from the emitter and the vertical ribs. A perceived limitation of this invention is that a special material or construction is required to prevent warping of the flat surface in close proximity to the vertical ribs.

U.S. patent application 20070125357 to R. Johnston, discloses a means by which a perforated plate is used to limit the flow of hot gas and air to the food which is located in close vertical proximity to the perforated plate by a series of vertical ribs. These vertical ribs function similarly to those in EP 1776028 in terms of reducing combustion of grease drippings in the channel, although the perforated holes limit the effectiveness of this feature by allowing some air to enter the channels from below. Cooking is carried out by a combination of convective heat through the perforated holes and radiant heat from the perforated plate and the heated vertical ribs. Flare ups that exist below the perforated plate following passage of reduced animal fats and grease to the hot surfaces below the plate are not able to pass through the small holes and, therefore, do not contact the food, although the heat generated by flares ups does make an overall contribution to cooking. However, this invention has perceived limitations in that the perforated plate is hard to clean and difficult to manufacture, and the grate includes two independent assemblies of substantial complexity.

Other devices, such as disclosed in U.S. Pat. No. 5,911,812, utilize fluid channels to direct the food drippings away from the hottest section of the cooking grill. Still other devices, such as disclosed in U.S. Pat. No. 6,314,870, utilize various forms of drip pans placed between the item being cooked and the heat source. In some cases, the above described devices require additional grill structural features for proper implementation. For example, the emitter of U.S. Pat. No. 6,114,666 require a support structure between the heat source and the cooking grate. Similarly, others of the devices reduce the flavor of the cooked food by completely eliminating or reducing the favorable impact of the food drippings.

SUMMARY

Cooking grates and grills incorporating such cooking grates are provided. In this regard, an exemplary embodiment of a cooking grate comprises: a plurality of elongate elements of heat resistant material, the elements being V-shaped in transverse cross-section, each of the elements having a first lower edge, a second lower edge and a vertex, the first lower edge and the second lower edge being spaced from each other with the vertex being located therebetween, the vertex being operative as a cooking surface to support food during cooking on the cooking grate; corresponding adjacent lower edges of adjacent ones of the elements being oriented to define gaps therebetween such that a first of the gaps, defined by a second lower edge of a first element and a first lower edge of a second element, exhibits a width of between approximately 5% and approximately 18% of a distance between the first lower edge and the second lower edge of the first element.

An exemplary embodiment of a cooking grill comprises: a base operative to house a heat source; a lid attached to the base; and a cooking grate supported by the base and positioned above the heat source; the cooking grate comprising: a plurality of elongate elements of heat resistant material, each of the elements having a first edge and a second edge with a cooking surface being formed between the first edge and the second edge of each element; corresponding adjacent edges of adjacent ones of the elements being oriented to define gaps therebetween such that a first of the gaps, defined by a second edge of a first element and a first edge of a second element, exhibits a width of between approximately 5% and approximately 18% of a distance between the first edge and the second edge of the first element.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of embodiments of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a cross-sectional end view of another embodiment of a cooking grate with a closed-grate configuration.

FIG. 7 is an isometric section view of another embodiment of a cooking grate with a closed-grate configuration.

FIG. 11 is Table 1A for a Standard Cast Iron Open Grate.

FIG. 12 is Table 1B for a standard Cast Iron Open Grate (Central Portion Only).

FIG. 13 is Table 2A for a Sample Closed-Configuration Grate.

FIG. 14 is Table 2B for a closed configuration Grate (Central Portion Only).

DETAILED DESCRIPTION

Cooking grates and grills incorporating such cooking grates are provided that are configured for reducing flare-ups. In this regard, in some embodiments, the cooking grate incorporates elements with narrow gaps between the elements. By way of example, the gaps of some embodiments may be between 5% and 18% of the widths of the elements forming the gaps. In some of these embodiments, the elements can be configured as inverted V-shaped elements, with the vertices of the elements being used as the cooking surfaces for supporting the cooking food.

Figure 1:
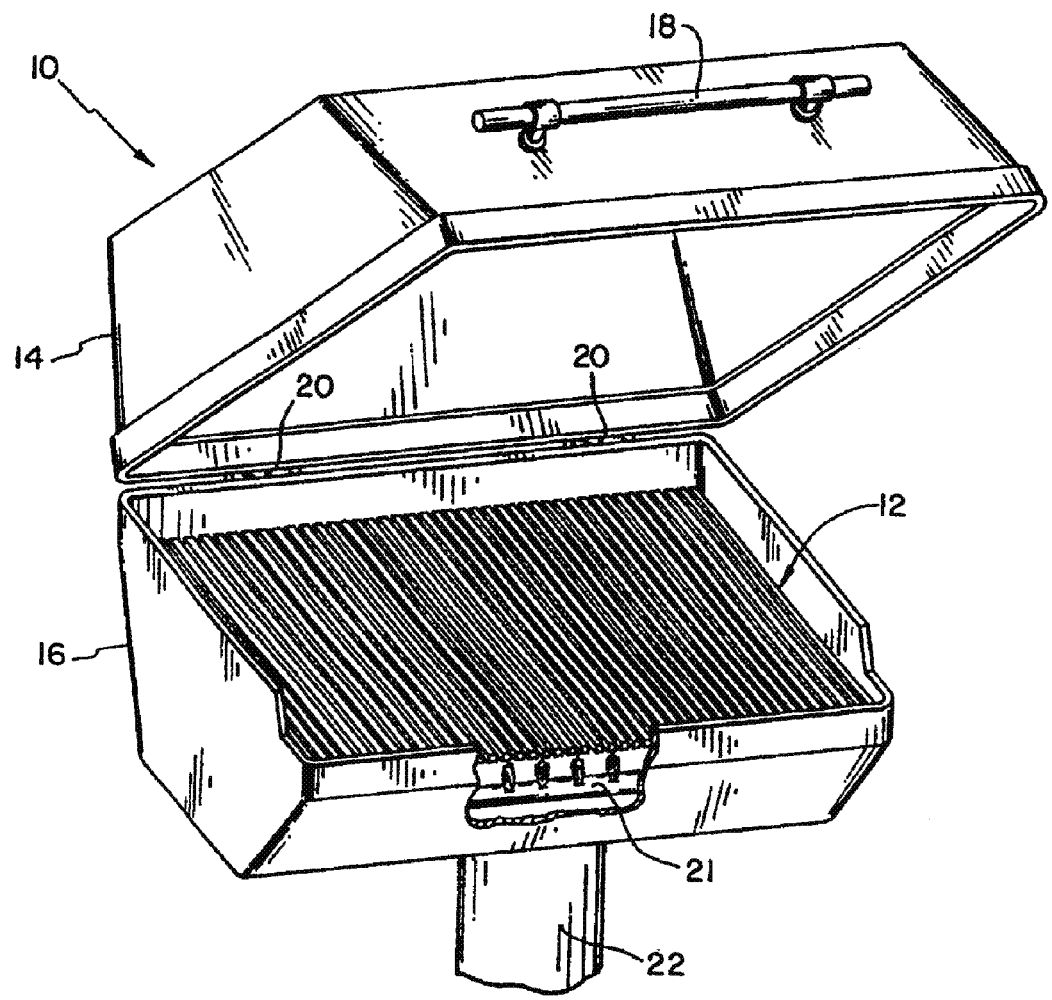
FIG. 1 is a perspective view of a prior art embodiment shown in U.S. Pat. No. 5,355,780 to Campbell.
Figure 2:
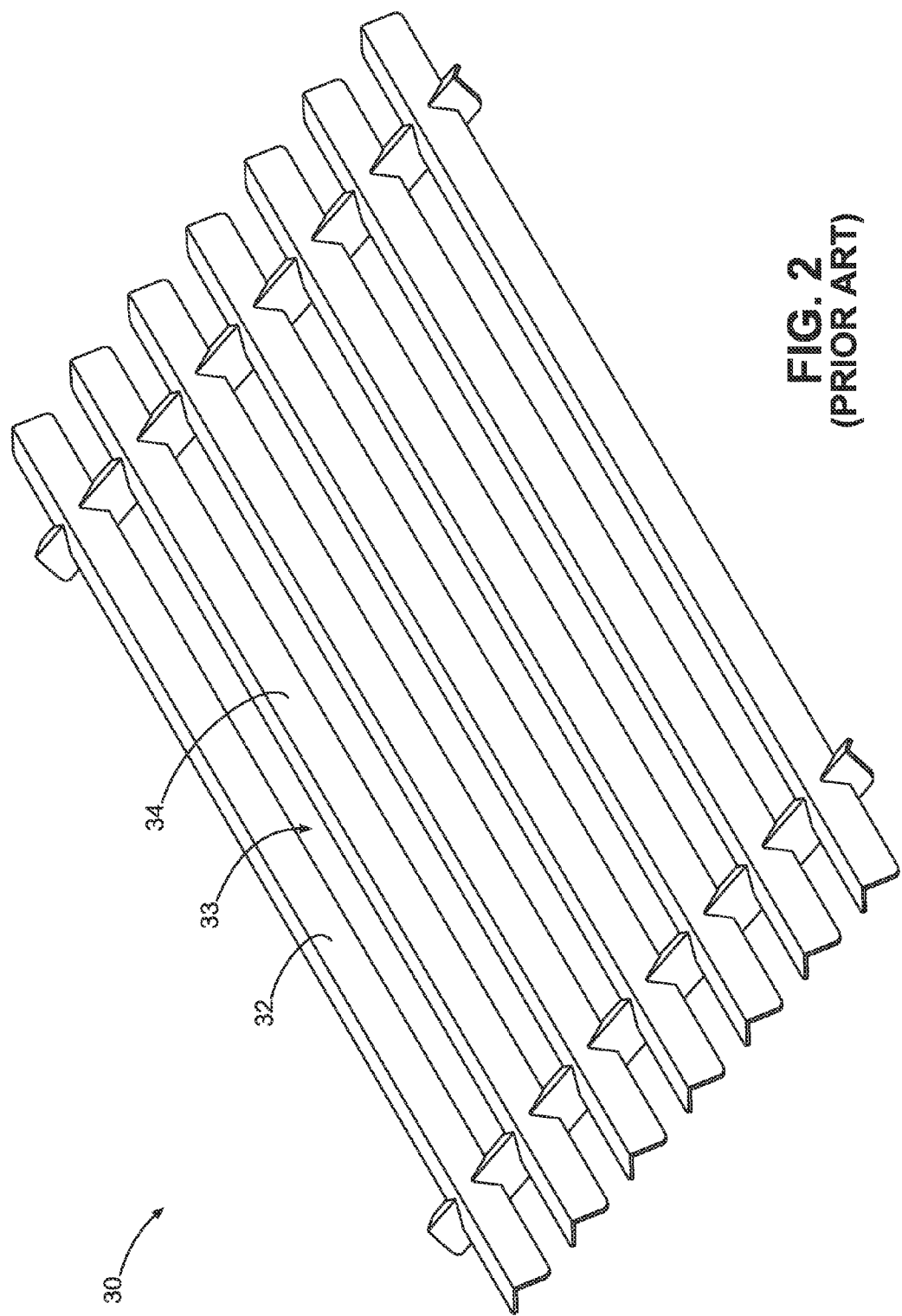
FIG. 2 is an isometric view of a prior art cooking grate.

In the past, cooking grates of the substantially open type have made of stamped sheet metal in the form of inverted V-shaped elements with spaces in between. In these open-grate configurations, the spaces between the elements are of a similar magnitude as the width of the elements. An example of this is shown in FIG. 2, which is an isometric view of a prior art cooking grate 30, with elements 32 and 34 being adjacent elements and a space or gap 33 being located therebetween.

Figure 3:
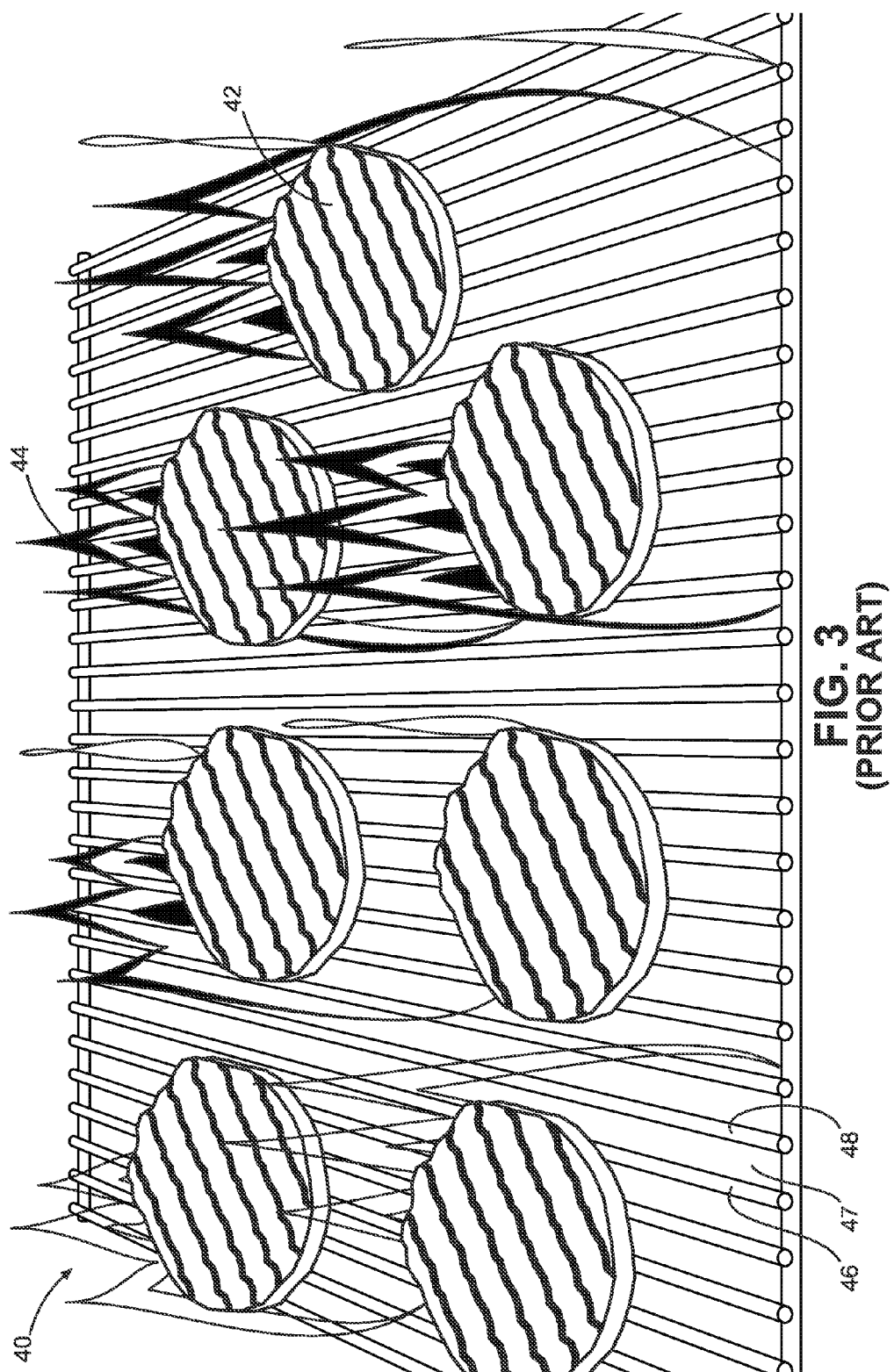
FIG. 3 is a perspective view showing hamburgers being cooked on a prior art cooking grate with an open-grate configuration.

In FIG. 3, another prior art cooking grate with an open-grate configuration is depicted. Specifically, grate 40 is being used to cook hamburgers (e.g., hamburger 42) with a significant degree of flare-ups being present (e.g., note flames 44). Note that the space between elements (e.g., space 47 between elements 46 and 48) is rather wide in comparison to the width of the elements themselves.

Figure 4:
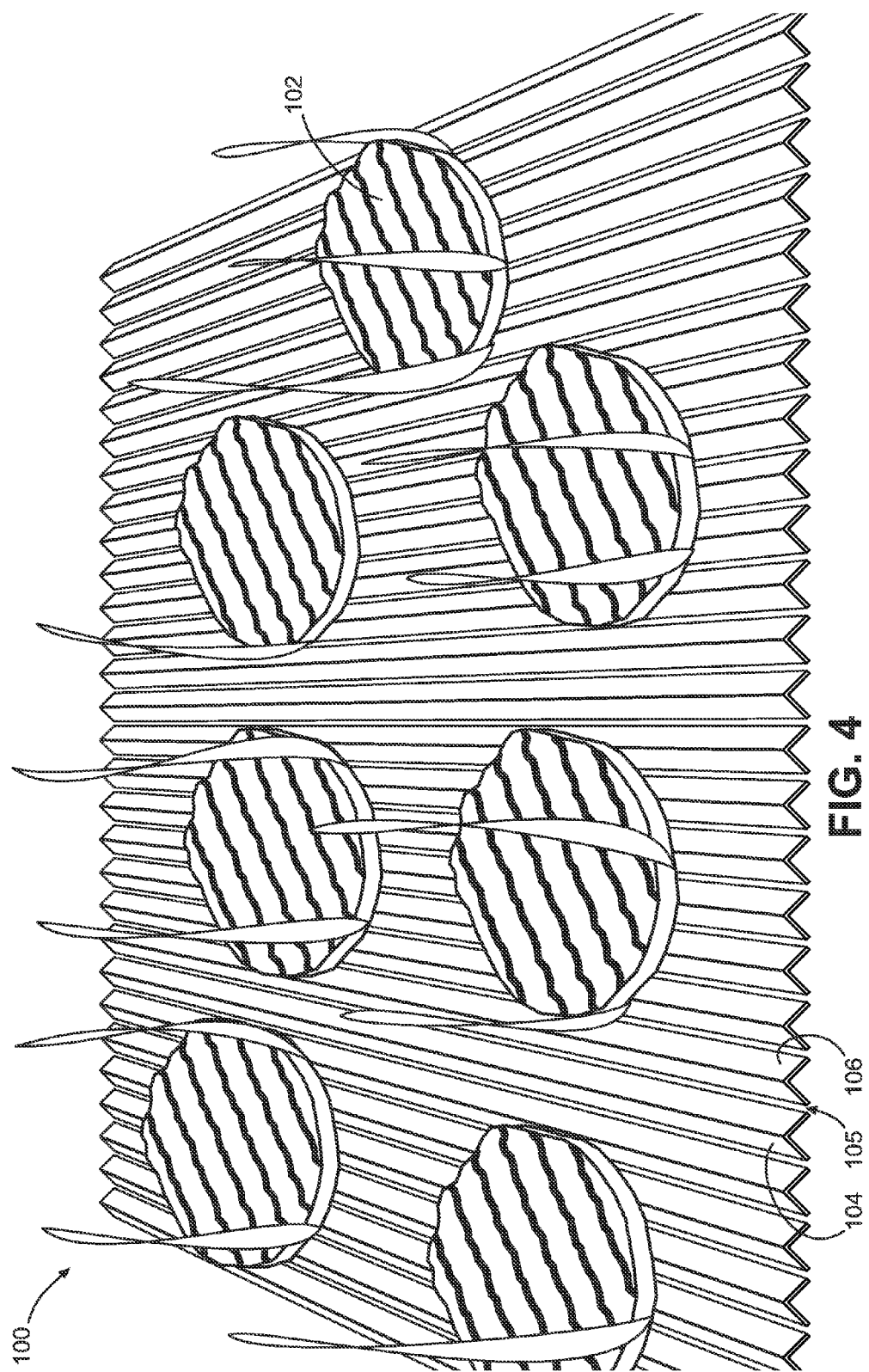
FIG. 4 is a perspective view showing hamburgers being cooked on an embodiment of a cooking grate with a closed-grate configuration.

In order to create a simple but effective way of reducing the effects of flare-ups, creating more even heat across the cooking grate surface, and/or increasing the contribution of infrared heating in the cooking of the food, grate elements are brought into substantially close and defined proximity to each other. This produces a qualitatively different type of performance than achieved with the prior art designs in that the distance between the elements becomes so small, flame suppression characteristics are evident, such as depicted in FIG. 4. Specifically, FIG. 4 is a perspective view showing hamburgers (e.g., hamburger 102) being cooked on an embodiment of a cooking grate (100) with a closed-grate configuration. Note the reduced spacing between elements. For example, elements 104 and 106 define a narrow space or gap 105.

In addition, the relatively restricted air flow across the entire plan of the cooking grate tends to equalize the relatively uneven upward convective flow of gases produced by burners, such as conventional convective burners of the front-to-back tubular type or side-to-side type, for example.

Figure 5:
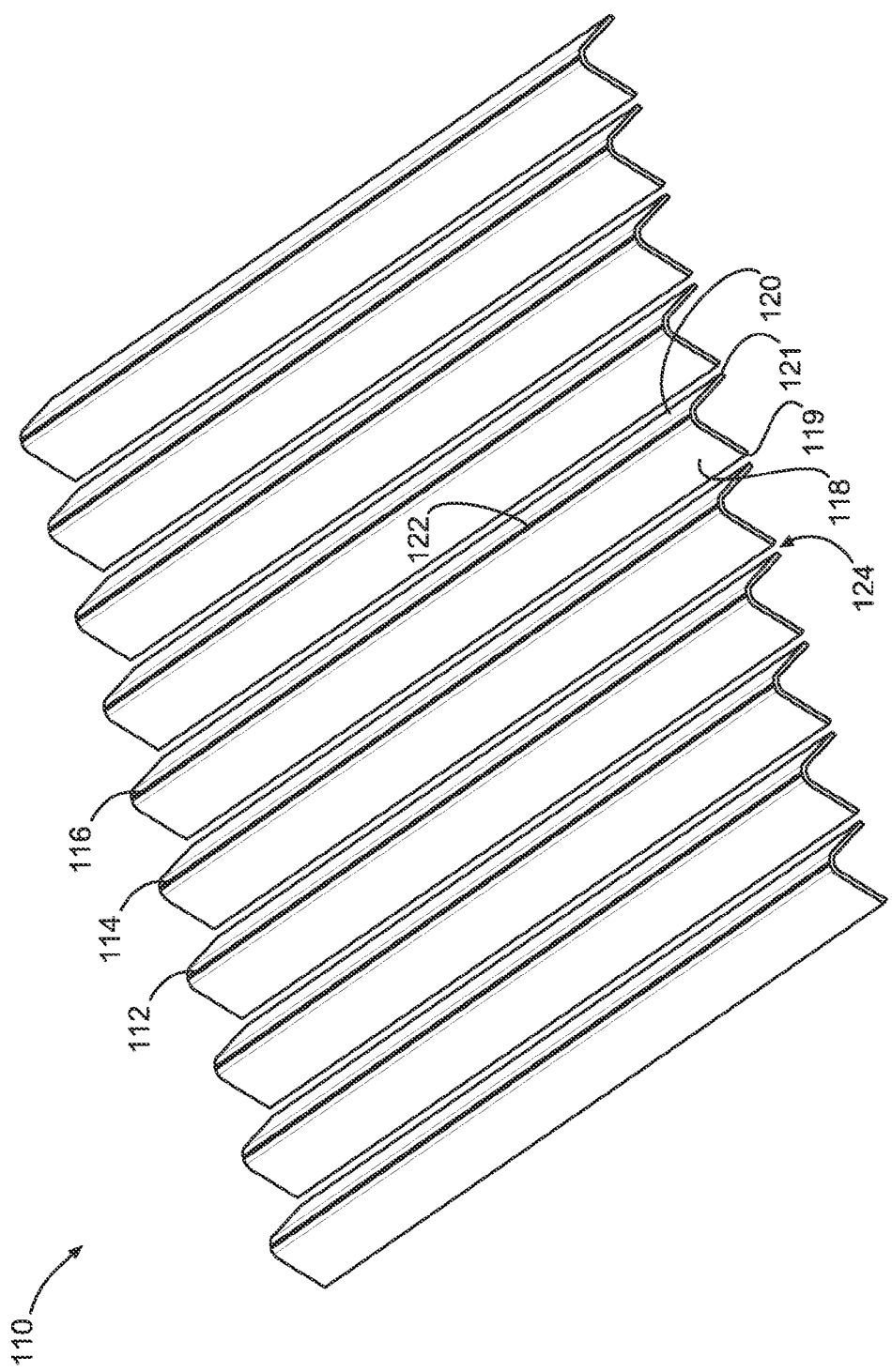
FIG. 5 is an isometric section view of an embodiment of a cooking grate with a closed-grate configuration.

FIG. 5 is an isometric section view of an embodiment of a cooking grate with a closed-grate configuration. As shown in FIG. 5, grate 110 includes a series of elongate cooking elements (e.g., elements 112, 114) that are arranged in a side-by-side orientation. Each of the elements is generally V-shaped (although inverted in use) when viewed in transverse cross-section. Specifically, as viewed in cross-section, each of the elements includes a pair of segments (generally linear in shape), each of which terminates in an edge. By way of example, element 116 includes segments 118, 120.

Segment 118 terminates in edge 119, and segment 120 terminates in edge 121. The edges of each element are parallel.

A vertex 122 is located at the intersection of the segments. In this embodiment, vertex 122 is curved. Various other shapes of segments and vertices can be used in other embodiments.

Gaps (e.g., gap 124) are formed between adjacent elements. As such, the gaps in the embodiment of FIG. 5 are parallel gaps. Each of the gaps exhibits a width of between approximately 5% and approximately 18%, preferably between approximately 5% and 12%, of the width of a corresponding element. Notably, as used herein, the width of an element is the distance between the edges of the element.

The improvement in heat distribution gained by using a dosed-grate configuration, such as the embodiment of FIG. 5, instead of an open grate is shown by comparing tests with data reproduced in Tables 1A, 1B and 2A, 28 below, in which the data points in the tables geographically correspond to thermocouple positions. By way of example, temperature measured at the back left of the grate is 788° F., whereas temperature at the front right is 699° F. See FIG. 11.

As shown in Table 1A, the standard deviation of the population is 42.2, with an average temperature of 717° F. Also, due to the thermocouple locations on the periphery being close to the outside edges of the firebox, which is cooled by contact with ambient air, it is justifiable to measure the central portion of the grate separately. See FIG. 12.

Thus, by using only the data from the central portion of the grate, the standard deviation of the population is 39.5, with an average temperature of 711° F.

In contrast, an exemplary embodiment of a closed-configuration grate tested as shown in FIG. 13.

As shown in Table 2A, the standard deviation of the population is 45.6, with an average temperature of 704° F. Again, due to the thermocouple locations on the periphery being close to the outside edges of the firebox, which is cooled by contact with ambient air, it is justifiable to measure the central portion of the grate separately. See FIG. 14.

Thus, by using only the data from the central portion of the grate, the standard deviation of the population is 16.3, with an average temperature of 745° F. Notably, the standard deviation of the temperature of the central (cooking) portion of the tested closed-configuration grate is less than half of that for the open-configuration grate.

The temperature difference between the lower edge of the inverted V-shaped element of the embodiment of FIG. 5 and the top of the vertex has also been measured and calculated using computational fluid dynamics tools. The measurements are shown in Table 3 below.

TABLE 3

| Location | Measured temps. (° F.) | | | | | | Avg. |
|---|---|---|---|---|---|---|---|
| Grate Top | 665 | 549 | 527 | 513 | 650 | 527 | 572 |
| Grate Btm | 814 | 672 | 684 | 660 | 798 | 684 | 719 |
| Difference | 149 | 123 | 157 | 147 | 148 | 157 | 147 |

Notably, the lower edges of the elements are heated substantially more than the vertices that contact the food. Therefore, the temperature of food contact can be at a level that sears but does not burn while the hotter lower edges can radiate to the food at close range with a higher temperature.

In order to define a grate that functions to the above description, we start by noting that the grate geometry is defined by an upper vertex and two lower edges that can form, in some embodiments, a simple inverted V-shape as shown in FIG. 6. In this regard, FIG. 6 is a cross-sectional end view of another embodiment of a cooking grate with a closed-grate configuration, in which the distance A represents the width of an element and distance B represents width of a corresponding gap. As can be seen in the drawing figure, the lower edges of any two adjacent grate elements are disposed in substantially the same plane and thus the gaps between any two lower edges of any two adjacent grate elements are substantially in the same plane.

Other embodiments, which can provide the same or similar functions, can maintain the relationship between these three points while exhibiting a form other than a straight line connecting the points. For example, straight line geometry approaching the vertex can be replaced by a curved segment, such as depicted in the embodiment of FIG. 7.

As shown in FIG. 7, grate 150 includes a series of elongate cooking elements (e.g., elements 152, 154) that are arranged in a side-by-side orientation. Each of the elements is generally V-shaped (although inverted) when viewed in transverse cross-section. Specifically, as viewed in cross-section, each of the elements includes a pair of segments (generally linear in shape), each of which terminates in an edge. By way of example, element 156 includes segments 158, 160, with a vertex 162 being located at the intersection of the segments. Segment 158 terminates in edge 159, and segment 160 terminates in edge 161. Notably, the portion of the element that incorporates the vertex is generally an inverted U-shaped portion; however, the overall V-shape of the element cross-section is maintained.

In the embodiment of FIG. 7, rails are included to maintain the relative positions of the elements. Although only one rail 166 is depicted in FIG. 7, this embodiment includes opposing rails, with the outer periphery of the grate being rectangular.

Figure 8:
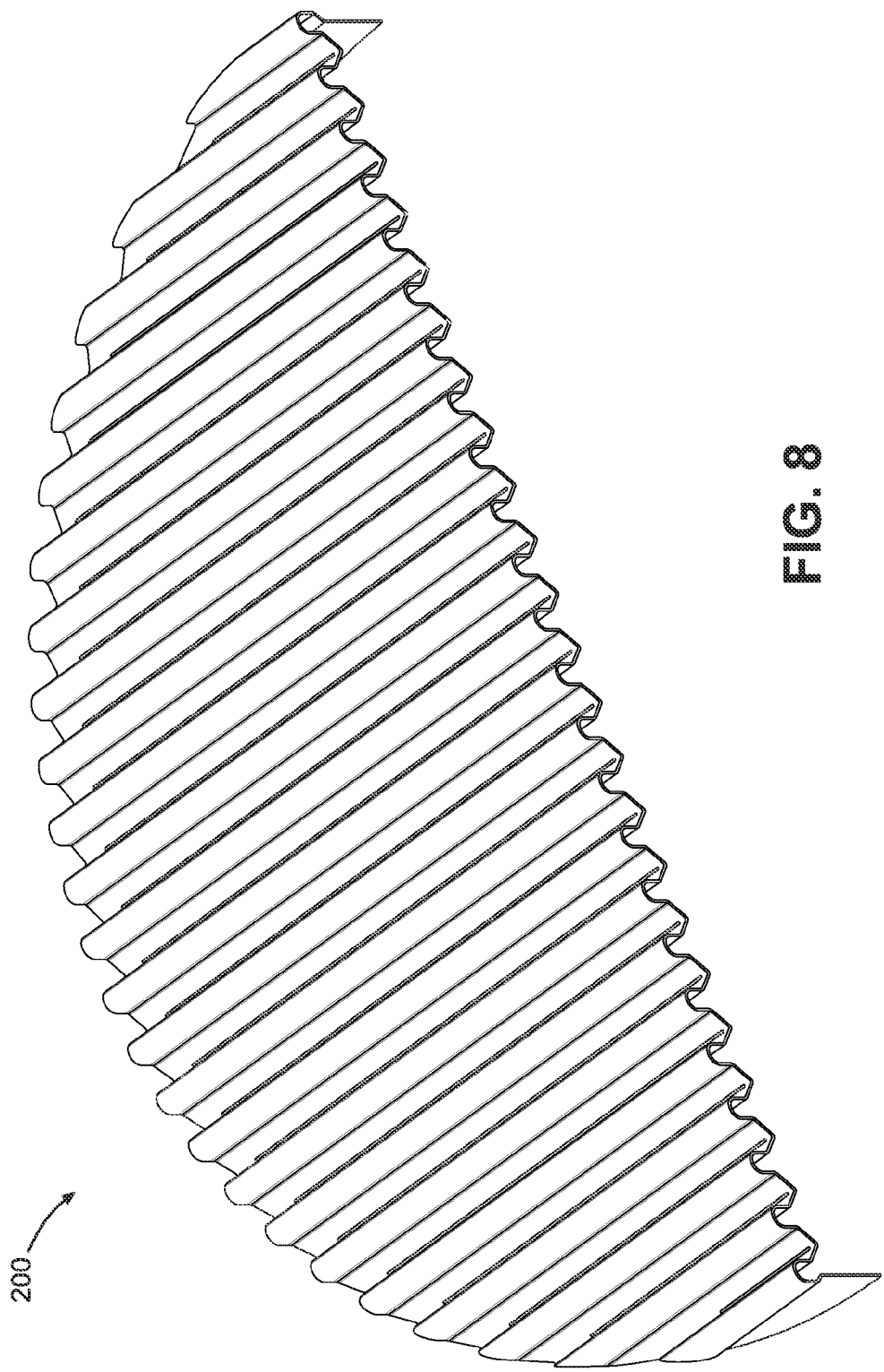
FIG. 8 is an isometric section view of another embodiment of a cooking grate with a closed-grate configuration.

Another embodiment of a grate is depicted in FIG. 8. Although the embodiment of FIG. 8 incorporates a similar element cross-section to that depicted in FIG. 7, grate 200 of FIG. 8 exhibits a circular periphery. Clearly, various other shapes can be used in other embodiments.

Figure 9:
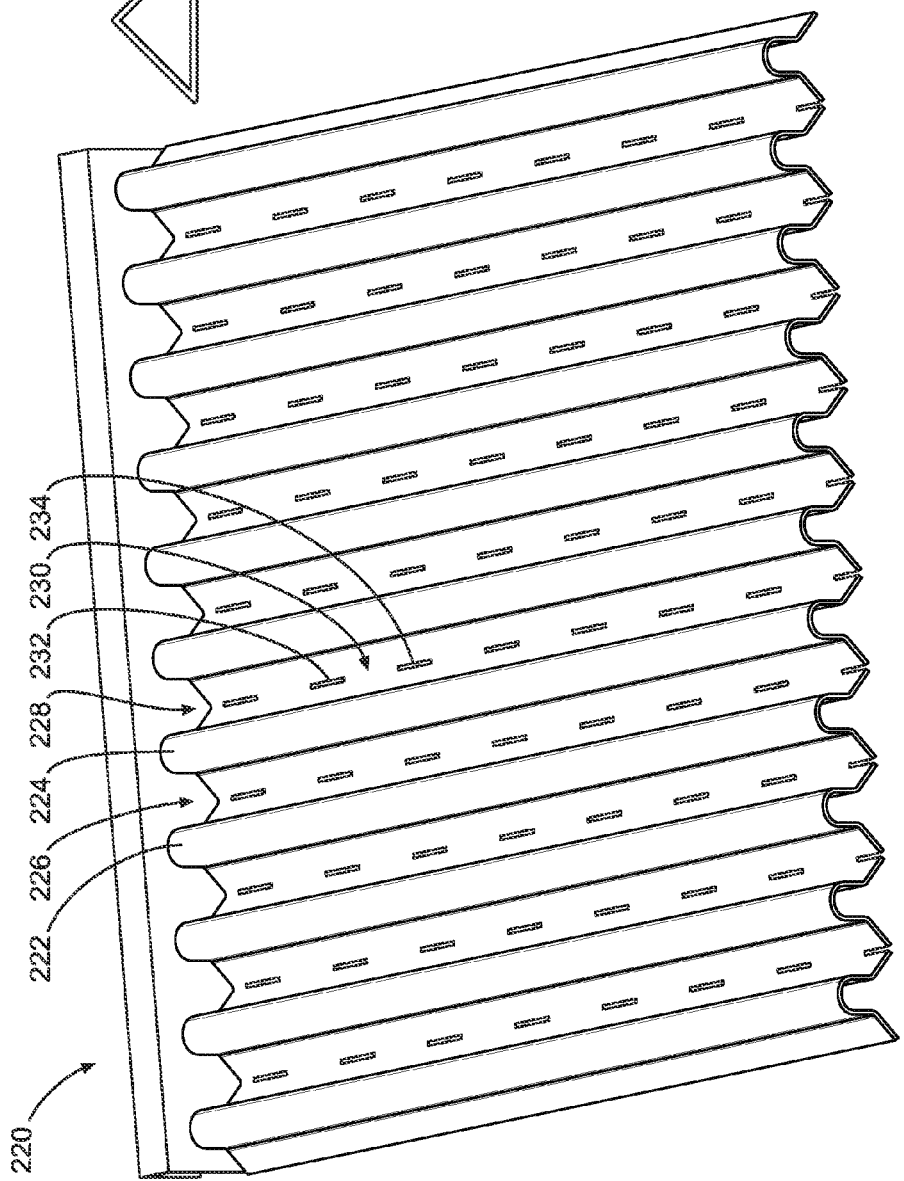
FIG. 9 is an isometric section view of another embodiment of a cooking grate with a closed-grate configuration.

FIG. 9 is an isometric section view of another embodiment of a cooking grate with a closed-grate configuration. In contrast to the previous embodiments, the embodiment of FIG. 9 includes elements that are joined at the edges. Specifically, grate 220 includes a series of elements (e.g., 222, 224), with a corresponding set of gaps being located between adjacent ones of the elements. Each set of gaps (e.g., set 226, 228) includes a linear arrangement of the gaps although other arrangements can be used in other embodiments. Note also that, in this embodiment, the spacing (e.g., 230) between adjacent gaps (e.g., 232, 234) of a particular set is slightly longer than the length of a gap. This too can vary among embodiments.

It is also possible to manufacture a grate of a closed-grate configuration from a single large stamping rather than multiple separate sections. In this case, the embodiment of FIG. 9, for example, could be formed by a series of slots pierced in line along the bottom vertex of the material that forms a continuous set of V-shaped corrugations. The choice of which approach to take will depend on judgment as to manufacturing cost and complexity, ease of cleaning and/or other factors not directly related to the performance characteristics mentioned above.

Figure 10:
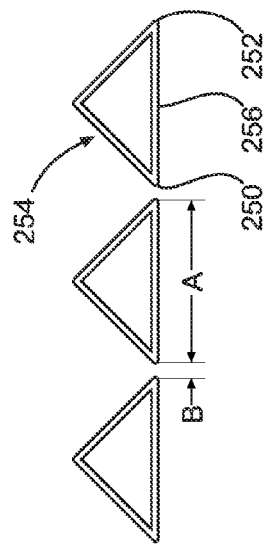
FIG. 10 is a cross-sectional end view of another embodiment of a cooking grate with a closed-grate configuration.

FIG. 10 is a cross-sectional end view of another embodiment of a cooking grate with a closed-grate configuration. As shown in FIG. 10, the relationship of B/A can be maintained with a design that includes a closed (or nearly so) cross-section. Note that, in contrast to previous embodiments that include elements with terminating lower edges, the edges (e.g., edges 250, 252) of an inverted V-shaped element (e.g., element 254) are spanned by a bottom wall (e.g., wall 256). This provides a hollow element. As noted hereinabove in the description of FIG. 6, the lower edges of any two adjacent grate elements are disposed in substantially the same plane and thus the gaps between any two lower edges of any two adjacent grate elements 254 are substantially in the same plane.

It should be noted that the embodiments shown are depicted as if made of sheet metal. However, various other materials can be used. Notably, any type of suitable heat resistant material such as, but not limited to, stainless steel, porcelain coated steel, titanium, cast iron, cast steel or other materials. Additionally or alternatively, the elements could be formed of solid material in contrast to relatively thin skinned embodiments (e.g., FIG. 10), without significantly altering the performance characteristics deriving from the fundamental geometry.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed:

1. A cooking grate for reducing flare-ups, comprising:
a plurality of elongate elements of heat resistant material in close proximity to each other, the elements having an inverted V shape in transverse cross-section in that (a) each of the elements has an upper vertex, (b) a lower portion of each of the elements has a first linear side which slopes outwardly as it extends downward and an opposite second linear side which slopes outwardly as it extends downward, the first linear side and the second linear side each having a lower edge, and (c) each of the elements further comprises an upper portion having an inverted U shape in transverse cross section wherein the inverted U shape of the upper portion comprises (i) a pair of spaced apart, parallel, vertical sides having upper ends and (ii) a curved top, wherein the curved top includes the upper vertex and extends between the upper ends of the vertical sides;
the lower edges of the first and the second linear sides of each of the elements being spaced from each other by a distance which defines a bottom width of the elements;
the upper vertex of each of the elements being located above and between the lower edges of the first and the second linear sides of the elements with the upper vertices of the elements forming a cooking surface to support food during cooking on the cooking grate;
the grate being formed of a continuous sheet of material with said elements being integrated therein such that downwardly projecting V-shaped corrugations are formed between the elements which each taper to a bottom point in transverse cross-section to form bottom vertices of the downwardly projecting V-shaped corrugations, wherein the bottom vertices extend longitudinally between the elements; and
openings are provided in the bottom vertices of the downwardly projecting V-shaped corrugations, each of the openings having a width, as viewed in transverse cross-section, of between 5% and 18% of the bottom width of the elements which restricts airflow through the grate and more evenly distributes (i) an upward convective flow of hot gases and (ii) radiant heat.

2. The cooking grate of claim 1, wherein the openings provided in the bottom vertices comprise a series of slots between each adjacent pair of the elements.

3. The cooking grate of claim 2, wherein the slots of the series of slots between each adjacent pair of the elements are oriented in a linear, end-to-end configuration in the bottom vertices.

4. The cooking grate of claim 1, wherein the lower edges of the first and the second linear sides of each of the elements extend parallel to each other.

5. The cooking grate of claim 1, wherein:
the cooking grate further comprises a rail defining an outer periphery of the cooking grate; and
the elements are supported by the rail.

6. The cooking grate of claim 5, wherein:
the rail is a first rail;
the cooking grate further comprises a second rail; and
the elements extend between the first rail and the second rail.

7. The cooking grate of claim 1, wherein each of the elements has a bottom opening between the lower edges of the first linear side and the second linear side of the elements.

8. The cooking grate of claim 1, wherein the width of the openings is between 5% and 12% of the bottom width of the elements.

* * * * *